US010239069B2

(12) United States Patent  
Rogers

(10) Patent No.: US 10,239,069 B2  
(45) Date of Patent: *Mar. 26, 2019

(54) AGRICULTURAL SKIN GRAFTING

(71) Applicant: aPEEL Technology, Inc., Goleta, CA (US)

(72) Inventor: James T. Rogers, Goleta, CA (US)

(73) Assignee: Apeel Technology, Inc., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/660,474

(22) Filed: Jul. 26, 2017

(65) Prior Publication Data

US 2017/0320077 A1 Nov. 9, 2017

Related U.S. Application Data

(63) Continuation of application No. 13/953,504, filed on Jul. 29, 2013, now Pat. No. 9,744,542.

(51) Int. Cl.
    *B05B 5/053*     (2006.01)  
    *B05B 5/025*     (2006.01)  
    (Continued)

(52) U.S. Cl.
    CPC .............. *B05B 5/0535* (2013.01); *A23B 4/10* (2013.01); *A23B 7/16* (2013.01); *A23B 9/14* (2013.01);  
    (Continued)

(58) Field of Classification Search
None  
See application file for complete search history.

(56) References Cited

U.S. PATENT DOCUMENTS 1,016,761 A     2/1912   Moore  
2,213,557 A     9/1940   Tisdale  
(Continued)

FOREIGN PATENT DOCUMENTS

CN     1215420 A     4/1999  
CN     1616561 A     5/2005  
(Continued)

OTHER PUBLICATIONS

Andrade et al., "Atomizing Spray Systems for Application of Edible Coatings," Comprehensive Reviews in Food Science and Food Safety, 2012, 11(3):323-337.

(Continued)

*Primary Examiner* — Binh X Tran  
*Assistant Examiner* — Bradford M Gates  
(74) *Attorney, Agent, or Firm* — Fenwick & West LLP

(57) ABSTRACT

A method of forming a material structure from structural units contained within a liquid solution in a spray head is described. The liquid solution includes a solvent and a solute, the solute comprising a plurality of the structural units, the structural units including monomer units, oligomer units, or combinations thereof. The method comprises forming droplets of the liquid solution including the structural units, and spraying the droplets on a substrate, thereby substantially increasing the reactivity of the structural units within the droplets relative to the structural units within the liquid solution in the spray head. The increase in reactivity can result from the droplets containing an excess of a particular ion, the ion excess resulting from a voltage applied to conductive walls of the device which dispenses the droplets. The material structure is then formed on the substrate from the more highly reactive structural units within the droplets.

28 Claims, 4 Drawing Sheets

(51) Int. Cl.
  *A23P 20/18* (2016.01)
  *A23N 15/06* (2006.01)
  *A23B 4/10* (2006.01)
  *A23B 7/16* (2006.01)
  *A23B 9/14* (2006.01)
  *A23P 20/15* (2016.01)

(52) U.S. Cl.
  CPC .............. *A23N 15/06* (2013.01); *A23P 20/15* (2016.08); *A23P 20/18* (2016.08); *B05B 5/0255* (2013.01)

(56) References Cited

U.S. PATENT DOCUMENTS

| | | |
|---|---|---|
| 2,275,659 A | 3/1942 | Steinle et al. |
| 2,324,448 A | 7/1943 | Gottlieb |
| 2,333,887 A | 11/1943 | Redlinger |
| 2,857,282 A | 10/1958 | Jansen |
| 3,232,765 A | 2/1966 | Rosenthal et al. |
| 3,997,674 A | 12/1976 | Ukai |
| 4,002,775 A | 1/1977 | Kabara |
| 4,421,775 A | 12/1983 | Chan, Jr. |
| 4,423,071 A | 12/1983 | Chignac et al. |
| 4,654,370 A | 3/1987 | Marriott, III et al. |
| 4,661,359 A | 4/1987 | Seaborne |
| 4,710,228 A | 12/1987 | Seaborne et al. |
| 4,732,708 A | 3/1988 | Ekman et al. |
| 4,962,885 A | 10/1990 | Coffee |
| 5,051,448 A | 9/1991 | Shashoua |
| 5,110,509 A | 5/1992 | Peter et al. |
| 5,126,153 A | 6/1992 | Beck |
| 2,363,232 A | 11/1994 | Witt |
| 5,376,391 A | 12/1994 | Nisperos |
| 5,389,389 A | 2/1995 | Beck |
| 5,607,970 A | 3/1997 | Ishihara et al. |
| 5,658,768 A | 8/1997 | Quinlan |
| 5,827,553 A | 10/1998 | Dimitroglou et al. |
| 5,832,527 A | 11/1998 | Kawaguchi |
| 5,906,831 A | 5/1999 | Larsson et al. |
| 5,925,395 A | 7/1999 | Chen |
| 5,939,117 A | 8/1999 | Chen et al. |
| 6,162,475 A | 12/2000 | Hagenmaier et al. |
| 6,165,529 A | 12/2000 | Yang |
| 6,241,971 B1 | 6/2001 | Fox et al. |
| 6,254,645 B1 | 7/2001 | Kellis, Jr. et al. |
| 6,255,451 B1 | 7/2001 | Koch et al. |
| 6,294,186 B1 | 9/2001 | Beerse et al. |
| 6,348,217 B1 | 2/2002 | Santos et al. |
| 6,503,492 B2 | 1/2003 | McGlone et al. |
| 7,375,135 B2 | 5/2008 | Najib-Fruchart et al. |
| 7,550,617 B2 | 6/2009 | Imig et al. |
| 7,732,470 B2 | 6/2010 | Imig et al. |
| 7,785,897 B2 | 8/2010 | Agnes et al. |
| 7,851,002 B2 | 12/2010 | Hekal et al. |
| 7,931,926 B2 | 4/2011 | Lidster et al. |
| 7,943,336 B2 | 5/2011 | Viksoe-Nielsen et al. |
| 8,101,221 B2 | 1/2012 | Chen et al. |
| 8,119,178 B2 | 2/2012 | Lidster et al. |
| 8,197,870 B2 | 6/2012 | Krasutsky et al. |
| 8,247,609 B2 | 8/2012 | Roques et al. |
| 8,263,751 B2 | 9/2012 | Peterson |
| 8,424,243 B1 | 4/2013 | Narciso et al. |
| 8,501,445 B2 | 8/2013 | Yoshikawa et al. |
| 8,546,115 B2 | 10/2013 | Buchert et al. |
| 8,609,169 B2 | 12/2013 | Chen et al. |
| 8,752,328 B2 | 6/2014 | Kaiser et al. |
| 8,846,355 B2 | 9/2014 | Yoshikawa et al. |
| 9,095,152 B2 | 8/2015 | Munger |
| 9,102,125 B2 | 8/2015 | Battersby et al. |
| 9,284,432 B2 | 3/2016 | Yoshikawa et al. |
| 9,770,041 B2 | 9/2017 | Dong et al. |
| 2001/0042341 A1 | 11/2001 | Hamersky et al. |
| 2002/0043577 A1 | 4/2002 | Krasutsky et al. |
| 2004/0022906 A1 | 2/2004 | Petacvich |
| 2004/0120919 A1 | 6/2004 | Nguyen et al. |
| 2004/0220283 A1 | 11/2004 | Zhang et al. |
| 2005/0233039 A1 | 10/2005 | Wolfe et al. |
| 2007/0278103 A1 | 12/2007 | Hoerr et al. |
| 2008/0026120 A1 | 1/2008 | Petcavich |
| 2008/0038471 A1 | 2/2008 | Boger et al. |
| 2008/0254987 A1 | 10/2008 | Liu et al. |
| 2008/0262190 A1 | 10/2008 | Koskimies et al. |
| 2008/0310991 A1 | 12/2008 | Webster et al. |
| 2009/0104446 A1 | 4/2009 | Guillet et al. |
| 2009/0142453 A1 | 6/2009 | Lobisser et al. |
| 2009/0152371 A1 | 6/2009 | Stark et al. |
| 2009/0325240 A1 | 12/2009 | Daniell |
| 2010/0029778 A1 | 2/2010 | Bailey et al. |
| 2010/0186674 A1 | 7/2010 | Cahill, Jr. et al. |
| 2010/0210745 A1* | 8/2010 | McDaniel .............. C09D 5/008 521/55 |
| 2010/0278784 A1 | 11/2010 | Pojasek et al. |
| 2010/0292426 A1* | 11/2010 | Hossainy ................ A61L 31/10 526/287 |
| 2011/0240064 A1* | 10/2011 | Wales ..................... C09D 5/14 134/26 |
| 2011/0244095 A1 | 10/2011 | Sardo |
| 2011/0280942 A1 | 11/2011 | Schad et al. |
| 2012/0003356 A1 | 1/2012 | Ekanayake et al. |
| 2012/0251675 A1 | 10/2012 | Sowa et al. |
| 2013/0209617 A1 | 8/2013 | Lobisser et al. |
| 2013/0216488 A1 | 8/2013 | Hernandez-Brenes et al. |
| 2014/0033926 A1 | 2/2014 | Fassel et al. |
| 2014/0199449 A1 | 7/2014 | Hernandez et al. |
| 2014/0205722 A1 | 7/2014 | Quintanar Guerrero et al. |
| 2014/0221308 A1 | 8/2014 | Baker et al. |
| 2014/0234921 A1 | 8/2014 | Nyyssola et al. |
| 2014/0348945 A1 | 11/2014 | Dong et al. |
| 2015/0030780 A1 | 1/2015 | Rogers |
| 2015/0079248 A1 | 3/2015 | Nussinovitch et al. |
| 2016/0002483 A1 | 1/2016 | Zhao et al. |
| 2016/0213030 A1 | 7/2016 | Schad |
| 2016/0256429 A1 | 9/2016 | Spanova et al. |
| 2016/0324172 A1 | 11/2016 | Williams et al. |
| 2017/0049119 A1 | 2/2017 | Perez et al. |
| 2017/0073532 A1 | 3/2017 | Perez et al. |
| 2017/0332650 A1 | 11/2017 | Holland |
| 2018/0044276 A1 | 2/2018 | Perez et al. |
| 2018/0092811 A1* | 4/2018 | Klee ....................... A61K 6/083 |

FOREIGN PATENT DOCUMENTS

| | | |
|---|---|---|
| CN | 101035926 A | 9/2007 |
| CN | 101356012 A | 1/2009 |
| CN | 102291986 A | 12/2011 |
| CN | 102335142 A | 2/2012 |
| CN | 103719261 | 4/2014 |
| DE | 2505428 | 8/1976 |
| DE | 3622191 | 1/1988 |
| EP | 0104043 | 3/1984 |
| EP | 1020124 A2 | 7/2000 |
| EP | 2389814 | 11/2011 |
| JP | 62-126931 | 6/1967 |
| JP | S54-139645 A | 10/1979 |
| JP | S58-034034 A | 2/1983 |
| JP | S63-062574 A | 3/1988 |
| JP | H04-507192 T | 12/1992 |
| JP | 2002-531075 T | 9/2002 |
| JP | 2008-504442 T | 2/2008 |
| JP | 2009-527357 T | 7/2009 |
| JP | 2012-515561 T | 7/2012 |
| WO | WO 93/06735 | 4/1993 |
| WO | WO 2001/001980 | 1/2001 |
| WO | WO 2004/030455 | 4/2004 |
| WO | WO 2009/119730 | 10/2009 |
| WO | WO 2011/014831 | 2/2011 |
| WO | WO 2012/042404 | 4/2012 |
| WO | WO 2015/017450 | 2/2015 |
| WO | WO 2015/028299 | 3/2015 |
| WO | WO 2015/052433 | 4/2015 |
| WO | WO 2015/176020 | 11/2015 |
| WO | WO 2016/168319 | 10/2016 |
| WO | WO 2016/187581 | 11/2016 |

(56) References Cited

FOREIGN PATENT DOCUMENTS

| WO | WO 2017/048951 | 3/2017 |
|---|---|---|
| WO | WO 2017/100636 | 6/2017 |
| WO | WO 2017/132281 | 8/2017 |

OTHER PUBLICATIONS

Banerjee and Mazumdar, "Review Article: Electrospray Ionization Mass Spectrometry: A Technique to Access the Information Beyond the Molecular Weight of the Analyte," International Journal of Analytical Chemistry, vol. 2012, Article ID 282574, 40 pages.

Bateman et al., "The Effect of Solvent on the Analysis of Secondary Organic Aerosol Using Electrospray Ionization Mass Spectrometry," Environ. Sci. Technol., 2008, 42(19):7341-7346.

Bateman et al, "Supporting Information for Manuscript es-2008-01226w—The Effect of Solvent on the Analysis of Secondary Organic Aerosol Using Electrospray Ionization Mass Spectrometry," [online] 2008; available from the Internet URL: http://aerosol.chem.uci.edu/publications/Irvine/2008.sub.—Bateman.sub.—EST.sub.—SOA.sub.—solvent.sub.—effects.sub.—supporting.sub.—info.pdf, 6 pages.

Bourtoom, "Edible Films and Coatings: Characteristics and Properties," International Food Research Journal, 2008, 15(3):1-12.

Cech and Enke, "Practical Implications of Some Recent Studies in Electrospray Ionization Fundamentals," Mass Spectrometry Reviews, 2001, 20:362-387.

Chen et al., "Electrospraying of Conducting Liquids for Monodisperse Aerosol Generation in the 4 nm to 1.8.mu.m Diameter Range," J. Aerosol Sci., 1995, 26(6):963-977.

Enke, "A Predictive Model for Matrix and Analyte Effects in Electrospray Ionization of Singly-charged Ionic Analytes," Analytical Chemistry, 1997, 69(23):4885-4893.

Gaskell, "Special Feature: Tutorial—Electrospray: Principles and Practice," J. Mass Spectrom, 1997, 32:677-688.

Huang et al., "Electron Transfer Reagent Anion Formation via Electrospray Ionization and Collision-induced Dissociation," Anal Chem., 2006, 78(21):7387-7391.

Huang et al., "Automation of a Fourier Transform Ion Cyclotron Resonance Mass Spectrometer for Acquisition, Analysis, and E-mailing of High-resolution Exact-mass Electrospray Ionization Mass Spectral Data," J. Am Soc Mass Spectrom, 1999, 10:1166-1173.

Jaworek, "Electrospray Droplet Sources for Thin Film Deposition," J. Mater Sci, 2007, 42:266-297.

Kebarle, "Special Feature: Commentary—A Brief Overview of the Present Status of the Mechanisms Involved in Electrospray Mass Spectrometry," J. Mass Spectrom, 2000, 35:804-817.

Keller et al., "Review Article: Interferences and Contaminants Encountered in Modern Mass Spectrometry," Analytica Chimica Acta, 2008, 627:71-81.

Kroll and Seinfeld, "Review: Chemistry of Secondary Organic Aerosol: Formation and Evolution of Low-volatility Organics in the Atmosphere," Atmospheric Environment, 2008, 42:3593-3624.

Li et al., "Direct Quantification of Organic Acids in Aerosols by Desorption Electrospray Ionization Mass Spectrometry," Atmospheric Environment, 2009, 43:2717-2720.

Nizkorodov et al., "Molecular Chemistry of Organic Aerosols through the Application of High Resolution Mass Spectrometry," Phys. Chem. Chem. Phys, 2011, 13:3612-3629.

Takats et al., "Special Feature: Perspective—Ambient Mass Spectrometry Using Desorption Electrospray Ionization (DESI): Instrumentation, Mechanisms and Applications in Forensics, Chemistry, and Biology," J. Mass Spectrom, 2005, 40:1261-1275.

Wang and Zenobi, "Evolution of the Solvent Polarity in an Electrospray Plume," J. Am Soc Mass Spectrom, 2010, 21:378-385.

Zhu and Cole, "Focus: Electrospray—Formation and Decompositions of Chloride Adduct Ions, [M+Ci], in Negative Ion Electrospray Ionization Mass Spectrometry," J. Am Soc Mass Spectrom, 2000, 11:932-941.

Zhu and Cole, "Ranking of a Gas-phase Acidities and Chloride Affinities of Monosaccharides and Linkage Specificity in Collision-induced Decompositions of Negative Ion Electrospray-generated Chloride Adducts of Oligosaccharides," J. Am Soc Mass Spectrom, 2001, 12:1193-1204.

Authorized officer Jong Kyung Lee, International Search Report and Written Opinion in PCT/US2014/048707, dated Nov. 13, 2014, 14 pages.

Andrade, R. D. et al., 2012, "Atomizing spray systems for application of edible coatings", Comprehensive Reviews in Food Science and Food Safety, 11(3): 323-337.

Ayala-Zavala, J.F. et al., 2008, "High Relative Humidity In-Package of Fresh-Cut Fruits and Vegetables: Advantage or Disadvantage Considering Microbiological Problems and Antimicrobial Delivering Systems?" J. Food Science 73:R41-R47.

Ben-Yehoshua, S. et al., 1998, "Modified-atmosphere packaging of fruits and vegetables: reducing condensation of water in bell peppers and mangoes", Acta Hort (ISHS) 464:387-92.

Bourtoom, T., 2008, "Edible films and coatings: characteristics and properties", International Food Research Journal, 15(3): 237-248.

van Doorn et al. Alkylethoxylate surfactants for rehydration of roses and Bouvardia flowers. Postharvest Biology and Technology 24: pp. 327-333 (2002).

van Doorn et al. Effects of surfactants on the longevity of dry-stored cut flowering stems of rose, Bouvardia, and Astilbe. Postharvest Biology and Technology, 3: pp. 69-76 (1993).

Deell, J.R. et al., 2006, "Addition of sorbitol with KMnO4 improves broccoli quality retention in modified atmosphere packages", J. Food Qual. 29:65-75.

Elgimabi and Ahmed. Effects of Bactericides and Sucrose-Pulsing on Vase Life of Rose Cut Flowers (Rosa hybirida). Botany Research International; 2(3): pp. 164-168 (2009).

He et al. Stem end blockage in cut Grevillea 'Crimson Yul-lo' inflorescences. Postharvest Biology and Technology 41: pp. 78-84 (2006).

Hojjati et al. Chemical Treatments of Eustoma Cut Flower Cultivars for Enhanced Vase Life. Journal of Agriculture and Social Sciences. 3(3): pp. 75-78 (2007).

Javad et al. Effect of Cultivar on Water Relations and Postharvest Quality ofGerbera (Gerbera jamesonii Bolus ex. Hook f.) Cut Flower. World Applied Sciences Journal 18(5): pp. 698-703, (2012).

Javad et al. Postharvest evaluation of vase life, stem bending and screening of cultivars of cut gerbera (Gerbera jamesonii Bolux ex. Hook f.) flowers. African Journal of Biotechnology 10(4): pp. 560-566 (2011).

Jones et al. Pulsing with Triton X-100 Improves Hydration and Vase Life of Cut Sunflowers (*Helianthus annuus* L.). HortScience 28(12): pp. 1178-1179 (1993).

van Meeteren. Water Relations and Keeping-Quality of Cut Gerbera Flowers. I. The Cause of Stem Break. Scientia Horticulturae. 8: pp. 65-74 (1978).

Roy, S. et al., 1996, "Modified atmosphere and modified humidity packaging of fresh mushrooms", J. Food Sci. 61:391-7.

Shirazi, A., and Cameron, A., 1992, "Controlling relative humidity in modified atmosphere packages of tomato fruit." HortScience 27:336-9.

Steuter et al. Water Potential of Aqueous Polyethylene Glycol. Plant Physiol. 67: pp. 64-67 (1981).

Anonymous: "Paint-Wikipedia", Jul. 2013, 7 Pages. https://en.wikipedia.org/w/index.php?title=Paint&oldid=563291624.

PCT International Search Report and Written Opinion for PCT/US2014/048707, dated Nov. 13, 2014, 12 pages.

Extended European Search Report for European Patent Application No. EP 14831592.2, dated Mar. 2, 2017, 9 Pages.

Alvaro, J. et al. "Effects of peracetic acid disinfectant on the postharvest of some fresh vegetables", Journal of Food Engineering, 2009, vol. 95, pp. 11-15.

Bewick, T., et al. "Evaluation of Epicuticular Wax Removal from Whole Leaves with Chloroform," Weed Technology, Jul.—SePages, 1993, vol. 7, No. 3, pp. 706-716.

Cantwell, M., "Properties and recommended conditions for long-term storage of fresh fruits and vegetables," Nov. 2001, 8 Pages.

(56) References Cited

OTHER PUBLICATIONS

Cochran, H.D. "Solvation in supercritical water", Fluid Phase Equilibria, 1992, vol. 71, pp. 1-16.
Gabler, M., et al. "Impact of Postharvest Hot Water or Ethanol Treatment of Table Grapes on Gray Mold Incidence, Quality, and Ethanol Content," Plant Disease, Mar. 2005, vol. 89, No. 3, pp. 309-316.
Gil, M. et al. "Fresh-cut product sanitation and wash water disinfection: Problems and solutions", International Journal of Food Microbiology, 2009, vol. 134, pp. 37-45.
Graca, J. et al., "Linear and branched poly (omega-hydroxyacid) esters in plant cutins," J. Agric. Food Chem., 2010, vol. 58, No. 17, pp. 9666-9674.
Hardenburg, R., et al., "The Commercial Storage of Fruits, Vegetables, and Florist and Nursery Stocks," United States Department of Agriculture, Agriculture Handbook No. 66, Sep. 1986, pp. 6-7, 30, 50-51.
Hauff, S. et al. "Determination of hydroxylated fatty acids from the biopolymer of tomato cutin and their fate during incubation in soil," Phytochemical Analysis, Aug. 26, 2010, vol. 21, No. 6, pp. 582-589.
Holcroft, D., "Water Relations in Harvested Fresh Produce," PEF White Paper No. 15-01, The Postharvest Education Foundation (PEF), May 2015, 16 Pages.
Jerome, F., et al. ""One pot" and selective synthesis of monoglycerides over homogeneous and heterogeneous guanidine catalysts" Green Chem., 2004, vol. 6, pp. 72-74.
Karabulut, O. et al. "Postharvest ethanol and hot water treatments of table grapes to control gray mold", Postharvest Biology and Technology, 2004, vol. 34, pp. 169-177.
Kolattukudy, P.E., "Cutin from plants," Biopolymers Online, 3a, 2005, 40 pages.
Krammer, P., et al. "Hydrolysis of esters in subcritical and supercritical water", Journal of Supercritical Fluids, 2000, vol. 16, pp. 189-206.
Loppinet-Serani, A. et al. "Supercritical water for environmental technologies", J Chem Technol Biotechnol, Jan. 12, 2010, vol. 85, pp. 583-589.
Matic, M., "The chemistry of Plant Cuticles: a study of cutin form *Agave americana* L.," 1956, Biochemical Journal, 1956, vol. 63, No. 1, pp. 168-176.
Mattson, F.H., et al., "Synthesis and properties of glycerides," J Lipid Research, Jul. 1962, vol. 3, No. 3, pp. 281-296.
Morton, H. "The Relationship of Concentration and Germicidal Efficiency of Ethyl Alcohol", Annals New York Academy of Sciences, 53(1), 1950, pp. 191-196.
Oh, D. et al. "Antimicrobial activity of ethanol, glycerol monolaurate or lactic acid against *Listeria monocytogenes*", International Journal of Food Microbiology, 1993, vol. 20, pp. 239-246.
Olmez, H. et al. "Potential alternative disinfection methods for organic fresh-cut industry for minimizing water consumption and environmental impact", LWT—Food Science and Technology, 2009, vol. 42, pp. 686-693.
Osman, S. F., et al., "Preparation, Isolation, and Characterization of Cutin Monomers and oligomers from Tomato Peels," J. Agric, Food Chem, 1999, vol. 47, No. 2, pp. 799-802.
Rutala, W. et al. "Guideline for Disinfection and Sterilization in Healthcare Facilities, 2008" CDC, 2008, 158 Pages.
Sasaki, M., et al. "Cellulose hydrolysis in subcritical and supercritical water", Journal of Supercritical Fluids, 1998, vol. 13, pp. 261-268.
Sasaki, M., et al. "Dissolution and Hydrolysis of Cellulose in Subcritical and Supercritical Water", Ind. Eng. Chem. Res., 2000, vol. 39, pp. 2883-2890.
Savage, P., "Organic Chemical Reactions in Supercritical Water", Chem. Rev., 1999, vol. 99, pp. 603-621.
Schreiber, L., "Transport barriers made of cutin, suberin and associated waxes", Trends in Plant Science, 2010, vol. 15, No. 10, pp. 546-553.
Schweizer, P., et al. "Perception of free cutin monomers by plant cells", The Plant Journal, 1996, vol. 10, No. 2, pp. 331-341.
Schweizer, P., et al. "Plant Protection by Free Cutin Monomers in Two Cereal Pathosystems", Advances in Molecular Genetics of Plant-Microbe Interactions, 1994, pp. 371-374.
Tanaka, M., et al., "Quantitative determination of isomeric glycerides, free fatty acids and triglycerides by thin layer chromatography-flame ionization detector system." Lipids, 1980, vol. 15, No. 10, pp. 872-875.
Weingartner, H., et al. "Supercritical water as a solvent", Angewandte Chemie, 2005, vol. 44, Issue 18, pp. 2672-2692.
Yeats, T., et al. "The identification of cutin synthase: formation of the plant polyester cutin," Nat Chem Biol. Jul. 2012, vol. 8, No. 7, pp. 609-611.
PCT International Search Report and Written Opinion for PCT/US2017/014978, dated Apr. 10, 2017, 13 Pages.
PCT International Search Report and Written Opinion for PCT/US2016/051936, dated Jan. 31, 2017, 18 Pages.
PCT International Search Report and Written Opinion in PCT/US2017/024799, dated Jun. 8, 2017, 13 Pages.
PCT International Search Report and Written Opinion in PCT/US2017/041167, dated Oct. 9, 2017, 20 Pages.
First Office Action for Chinese Patent Application No. CN 201480050446.3, dated Jun. 4, 2018, 30 Pages.
Notice of Reasons for Rejection for Japanese Patent Application No. JP 2016-531832, dated Jul. 3, 2018, 13 Pages.
Xizhong, W. et al, edited, "Spray drying", the 2nd edition, Chemical Industry Press, Feb. 28, 2003, pp. 147-151.

\* cited by examiner

AGRICULTURAL SKIN GRAFTING

RELATED APPLICATIONS

This application is a continuation of U.S. patent application Ser. No. 13/953,504, filed Jul. 29, 2013, now allowed, the entire contents of which is incorporated herein by reference in its entirety.

TECHNICAL FIELD

Described herein are methods and an apparatus for depositing material on a substrate, in particular for use in post harvest preservation of produce.

BACKGROUND

The two leading causes of produce spoilage are water loss via evaporation through the produce surface, and oxidation via reaction with oxygen gas that has diffused into the produce. Conventional approaches to preventing spoilage such as refrigeration or special packaging are costly to implement. Refrigeration requires expensive capital equipment, must be actively managed, has constant energy demands while operating, and can cause damage or quality loss to the produce. Special packaging requires expensive equipment, must be actively managed, and consumes packaging materials. Even with refrigeration and special packaging, the handling and transportation of the produce causes surface abrasion or bruising that is aesthetically displeasing to the consumer and serves as points of ingress for bacteria and fungi.

As a natural defense against spoilage, the aerial surfaces of all land plants are covered by a thin, highly cross-linked polyester known as cutin. Depositing an edible coating atop this cutin layer has been shown to reduce post harvest water loss and oxidation while helping resist surface abrasion. However, it is difficult to generate these coatings from non-toxic solvents with optimal diffusion barrier properties, as the films need to be processable (i.e. they must be highly soluble). Thus, conventional application of most edible coatings requires two steps; the deposition of the film, followed by a separate crosslinking step. These multiple processing steps make the use of edible coatings difficult to commercialize and increase the handling requirements of the produce.

SUMMARY

This specification describes methods and apparatus for depositing material on or applying a coating to a substrate. The coating can, for example, be an edible coating for produce that is grown at the site of deposition using only a single processing step, resulting in reduced water loss and oxidation of the produce while adding mechanical integrity to the surface. While coatings deposited by other methods are typically unbound to the coated surface, the methods and apparatus described herein can result in a coating which is covalently bonded to at least a portion of the surface. This may result in improved coating properties, such as higher durability and tighter control of coating permeability and thickness. Furthermore, layer by layer deposition of such coatings which bind to previously deposited material may be used to build more sophisticated three-dimensional structures (i.e. used as ink for three dimensional printing). In addition, the methods described herein enable the increase or decrease of ion concentrations within a solution immediately prior to contact of the solution with the substrate, which is useful in applications such as antimicrobial washes.

In a first aspect, a method of forming a material structure from structural units contained within a liquid solution in a spray head is described. The liquid solution includes a solvent and a solute, the solute comprising a plurality of the structural units, the structural units including monomer units, oligomer units, or combinations thereof. The method comprises forming droplets of the liquid solution including the structural units, and spraying the droplets on a substrate, thereby substantially increasing the reactivity of the structural units within the droplets relative to the structural units within the liquid solution in the spray head. The material structure is then formed on the substrate from the structural units within the droplets.

In a second aspect, a method of forming a coating over a surface of a substrate from structural units contained within a liquid solution in a spray head is described. The spray head comprises a dispensing device having an electrically conductive wall, and the liquid solution includes a solvent and a solute, the solute comprising a plurality of the structural units. The structural units in the solute include monomer units, oligomer units, or combinations thereof. The method comprises applying a voltage between the wall of the dispensing device and either an annular electrode of the spray head or ground, thereby causing a surface of the liquid solution adjacent to the dispensing device to become electrically charged. The method also includes forming droplets from liquid solution at the electrically charged surface, causing the droplets to have an electrical charge, and directing the droplets to the surface of the substrate, wherein the droplets include a plurality of the structural units of the solute. The method further includes forming the coating over the surface of the substrate from the plurality of the structural units in the droplets.

In a third aspect, a method of catalyzing covalent bonding of structural units on a surface of a substrate is described. The structural units comprise monomer units, oligomer units, or combinations thereof. The method comprises providing a spray head which includes a dispensing device having an electrically conductive wall, the spray head containing a liquid solution which includes a solvent. The method further includes applying a voltage between the wall of the dispensing device and either a ground or an annular electrode of the spray head, wherein the applied voltage causes a surface of the liquid solution adjacent to the dispensing device to have a net electrical charge. The method also includes forming droplets from liquid solution at the electrically charged surface adjacent to the dispensing device, causing the droplets to have a net electrical charge, and spraying the droplets on the surface of the substrate. The method further includes allowing solvent in the droplets to at least partially evaporate, wherein the net electrical charge of the droplets causes an ion concentration of the liquid solution contained within the droplets to change as the solvent evaporates.

In a fourth aspect, a method of modifying an ion concentration of a liquid solution is described. The method includes providing an assembly comprising a reservoir coupled to a dispensing device, the dispensing device comprising an electrically conductive wall, the reservoir containing the liquid solution. The method also includes applying a voltage between the wall of the dispensing device and either a ground or an annular electrode of the assembly, thereby causing a surface of the liquid solution adjacent to the dispensing device to have a net electrical charge. The method further includes forming droplets from liquid solution at the electrically charged surface adjacent to the dispensing device, causing the droplets to have a net electrical charge, and allowing the droplets to partially evaporate. The partial evaporation of the droplets causes the ion concentration of the solution in the droplets to differ from the ion concentration of the solution in the reservoir.

In a fifth aspect, an assembly adapted for forming a material structure from a plurality of structural units is described, where the structural units comprise monomer units, oligomer units, or combinations thereof. The assembly includes a spray head adapted to hold a liquid solution including a solvent and a solute, the solute comprising the structural units in a non-reactive state or in a state of low reactivity, such that the structural units do not substantially bond with one another, the spray head having an attached dispensing device whose walls are electrically conductive. The assembly also includes a voltage supply having a first terminal and a second terminal, with the first terminal electrically connected to the walls of the dispensing device and the second terminal electrically connected either to ground or to an annular electrode of the spray head. The application of a voltage from the voltage supply causes electrically charged droplets of the liquid solution to be emitted from the dispensing device, thereby changing the pH of the droplets as solvent in the droplets evaporates.

The methods, assemblies, and apparatuses described herein can each include one or more of the following features. Substantially increasing the reactivity of the structural units can enable the structural units to covalently bond with one another or with the substrate at a higher rate than before the increase in the reactivity. The material structure can be a coating, and the coating can be formed over an entirety of and completely surround the substrate. The substrate can be edible to humans, and the coating can be an edible coating. The coating can be configured to prevent or suppress water loss or uptake by the substrate, volatile loss or uptake by the substrate, oxidation via reaction with oxygen gas that can diffuse into the substrate, or surface abrasion. The material structure can be a coating, and the coating can be formed over a portion of the substrate. The spray head can include a capillary electrically connected to a first terminal of a voltage supply, and voltage provided by the voltage supply can cause a surface of the liquid solution adjacent to the capillary to have a net electrical charge. The spray head can further include an annular electrode, and a second terminal of the voltage supply can be electrically connected to the annular electrode.

A second terminal of the voltage supply can be electrically connected to an electrical ground. The droplets can be formed from liquid solution at the surface adjacent to the capillary, causing the droplets to have a net electrical charge. The method can further comprise allowing solvent from the droplets to at least partially evaporate, wherein the net electrical charge of the droplets causes the liquid solution contained within the droplets to have a different ion concentration than the liquid solution contained within the spray head after the at least partial evaporation of the solvent. The difference in ion concentration between the liquid solution contained within the droplets and the liquid solution contained within the spray head can cause the structural units in the droplets to be substantially more reactive than the structural units contained within the spray head. Forming the material structure can comprise polymerization of the structural units, wherein the polymerization occurs directly on or adjacent to the surface of the substrate.

The forming of the coating can comprise polymerization of the structural units, wherein the polymerization occurs directly on or adjacent to the surface of the substrate. The structural units can be monofunctional molecules, and forming the coating can comprise forming a substantially monolayer coating of the monofunctional molecules. The forming of the coating can further comprise causing a plurality of the monofunctional molecules to each form a covalent bond to a bonding site on the surface of the substrate. The method can further include allowing solvent from the droplets to at least partially evaporate, wherein the net electrical charge of the droplets causes the liquid solution contained within the droplets to have a different ion concentration than the liquid solution contained within the spray head after the at least partial evaporation of the solvent. The difference in ion concentration between the liquid solution contained within the droplets and the liquid solution contained within the spray head can cause the structural units in the droplets to be in a substantially more non-equilibrium state than the structural units contained within the spray head.

The substrate can be edible to humans, and the coating can be an edible coating. The liquid solution within the reservoir can be configured such that the structural units in the solute within the reservoir are in a substantially equilibrium state, such that they do not substantially bond with one another. The forming of the droplets and the causing of the droplets to have a net electrical charge can result in the solution in the droplets being in a state which is further from equilibrium than a state of the solution contained within the reservoir, allowing the structural units in the droplets to form covalent bonds to one another or to the substrate. The dispensing device can comprise a capillary.

The ion concentration of the liquid solution after the at least partial evaporation of the solvent in the droplets can be within a range that is sufficient to catalyze the covalent bonding of the structural units adjacent to the droplets on the surface of the substrate. The catalyzing of the covalent bonding can comprise catalyzing polymerization of the structural units to form a polymeric material structure on the surface of the substrate. The catalyzing of the covalent bonding can further comprise catalyzing the formation of covalent bonds between at least some of the structural units of the polymeric material structure and the surface of the substrate. The polymeric material structure can be a protective coating that surrounds the substrate. The method can further comprise spraying the droplets on a substrate, wherein the droplets serve to sanitize the substrate. The substrate can comprise agricultural equipment, produce, or medical equipment.

The material structure can comprise a polymer formed of the structural units. The assembly can further comprise a substrate configured to receive the droplets, wherein the substrate is edible to humans, and the material structure comprises an edible coating. At least some of the structural units of the edible coating can be covalently bonded to a surface of the substrate.

The details of one or more implementations of the invention are set forth in the accompanying drawings and description below. Other features and advantages of the invention will be apparent from the description and drawings, and from the claims.

DESCRIPTION OF DRAWINGS

Like reference symbols in the various drawings indicate like elements.

DETAILED DESCRIPTION

Described herein are methods and apparatus for depositing material on or applying a coating to a substrate. The deposited material or coating is formed from a solution in a reservoir, the solution including a solvent which contains a solute of monomers and/or oligomers of the material to be coated over or deposited on the substrate. While in the solvent, the monomers and/or oligomers of the solute are in a non-reactive state, or in a state of low reactivity, such that they do not substantially bond with one another and/or with other constituents of the solution. Small droplets of the solution are then formed and directed towards the surface that is to be coated. As described in further detail below, the methods by which the droplets are formed cause the monomers/oligomers in the droplets to become reactive, or to become substantially more reactive than they were in the solution prior to droplet formation. Thus when the droplets reach the surface of the substrate, as the solvent evaporates (increasing the monomer/oligomer concentration within the droplets), the activated monomers/oligomers covalently bond directly to the surface of the substrate or to previously deposited portions (i.e., previously deposited monomer/oligomer units) of the coating. In this manner, the coating is "grown" over the surface of the substrate.

As used herein, the term "substrate" refers to any object or material to which the reactive droplets described herein are directed and over which a resultant coating is formed or material is deposited. Although in many applications the coatings are formed over the entire outer surface of the substrate, in some applications the coatings may not cover the entire outer surface or may include apertures or porous regions which expose a portion of the outer surface of the substrate.

In some implementations, the substrate is edible to humans, and the coating is an edible coating. The coating prevents or suppresses water loss from the substrate via evaporation through the substrate surface (or stem area) as well as oxidation via reaction with oxygen gas that has diffused into the substrate, and, in addition, it delays the release of other volatiles, insulates the produce, and can also help prevent surface abrasion. Examples of edible substrates include fruits, vegetables, produce, seeds, nuts, beef, poultry, and seafood.

In some implementations, the coating is formed as or includes an organic material, while in other implementations the coating is formed as or includes an inorganic material. In still other implementations, the coating is formed of or includes both organic and inorganic material. The substrate may be a plant, such as a picked flower, and the coating may be a non-toxic coating which serves to increase the lifespan of the plant and prevent spoilage.

Figure 1:
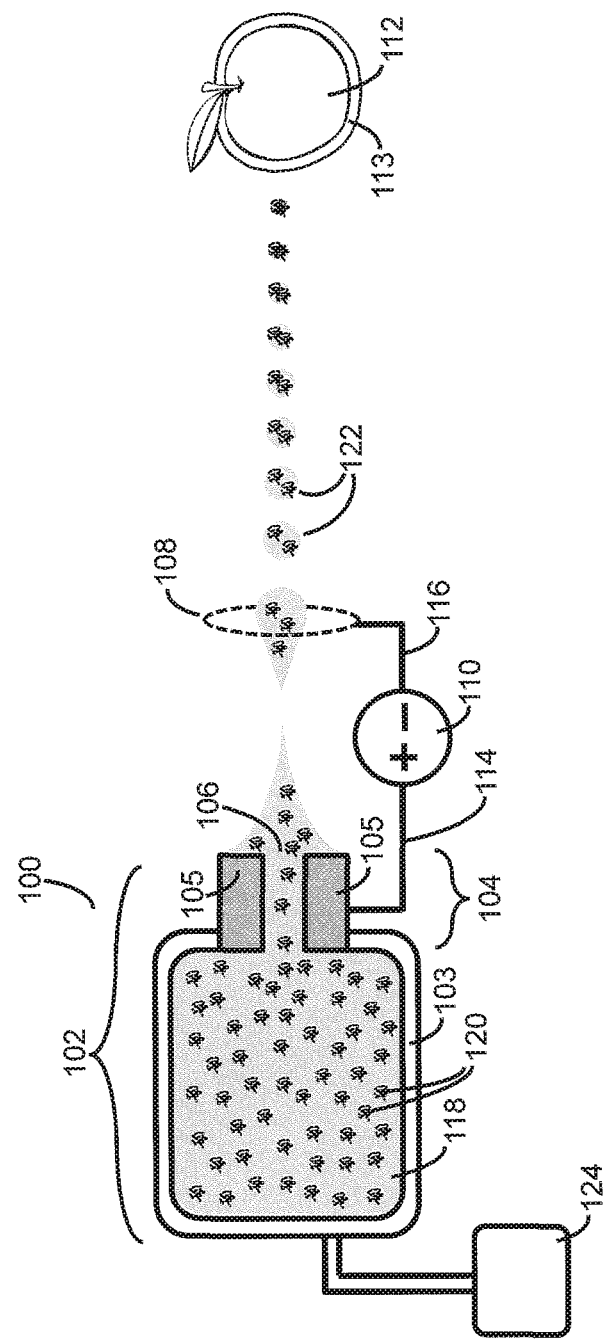
FIGS. 1 and 2 are each side views of a deposition system for a coating.

Referring now to FIG. 1, a spray head 100 is used to form reactive droplets 110 of solution and direct them towards the substrate 112. As used herein, the term "spray head" refers generally to any vessel or container which is capable of holding a solution, the solution being a liquid or fluid, and which causes droplets of the solution to be formed and directed (e.g., "sprayed") in one or more desired directions. The spray head 100 includes a reservoir 102 having a dispensing device such as a capillary 104 on one end. The cross-section of the capillary 104 can be circular, square, rectangular, oval, or any arbitrary shape. The walls 105 of the capillary 104 are metallic or otherwise formed of an electrically conductive material, while the walls 103 of the remainder of the reservoir 102 are formed of an electrically insulating material, such as plastic or any other sufficiently rigid, insulating material.

The materials that the walls of the reservoir 102 and capillary 104 are formed of are chemically inert and should not react with the solution 118 contained within the reservoir. The spray head 100 optionally includes an annular electrode 108, which is also metallic or electrically conductive. The capillary 104 and annular electrode 108 are both configured such that their respective average inner diameters are adjustable. The average inner diameter of the capillary 104 is typically between about 10 microns and 1 meter, and the average inner diameter of the annular electrode 108 is typically between about 10 microns and 1 meter. The annular electrode 108 is typically substantially centered around the tip 106 of the capillary 104, such that the capillary 104 and the annular electrode 108 may be substantially coaxially aligned. The spray head 100 can be configured such that the separation between the annular electrode 108 and the tip 106 of the capillary 104 is adjustable. Typically, the separation between the annular electrode 108 and the tip 106 of the capillary 104 is between about 10 microns and 10 centimeters.

Still referring to FIG. 1, the walls of the capillary 104 and the annular electrode 108 are maintained at a different electric potential by a voltage supply 110 whose output voltage can be varied. As used herein, a "voltage supply" refers to a device or system that includes two outputs and generates an electric potential difference between the two outputs. A few examples of voltage supplies include batteries, voltage-variable power supplies, photovoltaic or thermoelectric generators, gas or diesel generators, and Kelvin generators. One terminal of the voltage supply 110 is electrically connected to the walls of the capillary 104, for example with a conductive wire 114, and the opposite terminal of the voltage supply 110 is electrically connected to the annular electrode 108, for example with another conductive wire 116.

As also shown in FIG. 1, the reservoir 102 is filled, or at least partially filled, with a solution including a solvent 118 which contains a solute 120 comprised of monomers and/or oligomers of the material to be deposited over the surface of the substrate 112. The pressure within the reservoir 102 is optionally maintained by an external pump 124.

As described above, the solute 120 includes monomers and/or oligomers of the material to be deposited over the surface of the substrate 112. The monomers or oligomers can, for example, be short chain fatty acids possessing both a carboxyl functionality and a hydroxyl functionality at or near opposite ends of a saturated or unsaturated hydrocarbon chain, which may optionally contain additional chemical constituents (e.g. epoxides, hydroxyls, glycerols, etc.). The monomers may also include leaving groups bound to one or more of the monomer functionalities, which can be included to influence reaction kinetics and/or alter monomer solubility. The solvent 118 can be any organic or inorganic solvent which solvates or at least partially solvates the monomers/oligomers that are pumped into the reservoir 102. The solvent 118 can be any polar, non-polar, protic, or aprotic solvent, including any combination thereof. Examples of solvents that can be used include water, methanol, ethanol, acetone, isopropanol (i.e., isopropyl alcohol), or combinations thereof.

During the time that the solution is contained within the reservoir, the solution is configured such that the monomers/oligomers in the solute 120 are in a non-reactive state, or in a state of low reactivity, such that they do not substantially bond with one another and/or with other constituents of the solution. For example, for some monomer/oligomer solute compositions, the pH of the solution is sufficiently low (i.e., the solution is sufficiently acidic) to catalyze reactions that result in covalent bonding of the monomers/oligomers to each other or to the substrate. When these monomer/oligomer solute compositions are used, the solution is configured such that while it is contained within the reservoir, its pH is sufficiently high (i.e., the solution is sufficiently neutral/basic) such that the monomers/oligomers in the solute do not substantially bond with one another and/or with other constituents of the solution. For other monomer/oligomer solute compositions, the pH of the solution is sufficiently high (i.e., the solution is sufficiently neutral/basic) in order to catalyze the reactions. When these other monomer/oligomer solute compositions are used, the solution is configured such that while it is contained within the reservoir, its pH is sufficiently low (i.e., the solution is sufficiently neutral/acidic) such that the monomers/oligomers in the solute do not substantially bond with one another and/or with other constituents of the solution.

In view of the configuration of the solution described above, without activating the monomers/oligomers such that they are in a more reactive state, the monomers/oligomers would be incapable of forming or unlikely to form covalent bonds to the substrate 112 and/or with each other when applied to the substrate, and therefore may not form a coating 113 that is sufficiently protective. In the case where the pH of the solution is above the minimum value required to catalyze a reaction, adding an acid to the solution can activate the monomers/oligomers and place them in a more reactive state, such that they are subsequently capable of forming covalent bonds to the substrate 112 and/or to each other. However, such a process is undesirable in many applications. For example, in post-harvest preservation of produce, use of certain strong acids is prohibited in food additives, since such a process can result in the produce being classified as unsafe for human consumption. Furthermore, once the solute is in a more reactive state, the monomers/oligomers begin to bond with one another indiscriminately and polymerize prior to being placed on the surface of the substrate 112, which can degrade the properties of the resultant coating 113, or result in the properties of the coating 113 being less controllable, as described in more detail below. Similarly, in the case where the pH of the solution is below the minimum value required to catalyze reactions, adding a base to the solution can activate the monomers/oligomers and place them in a more reactive state, such that they are subsequently capable of forming covalent bonds to the substrate 112. However, similar concerns and complications to the case described above where an acid is added to the solution also persist.

Referring again to FIG. 1, in order to form a coating 113 over the substrate 112, the portion of the substrate 112 being coated may be substantially centered about the tip 106 of the capillary 104 and held at a controllable distance from the annular electrode 108, and a voltage between the annular electrode 108 and the capillary 104 is applied by the voltage supply 110. The distance between the surface of substrate 112 being coated and the annular electrode 108 can be fixed or varied during the deposition process. Droplets 122 of the solvent 118 and solute 120 are formed and are directed towards the substrate 112, as shown.

The droplets 122 are formed by applying a voltage applied between the annular electrode 108 and the capillary 104, resulting in a net accumulation of electric charge along the surface of the solution adjacent to the tip 106 of the capillary 104. The polarity of the charge (i.e., whether it is positive or negative) is determined by the polarity of the applied voltage. Surface tension effects, in combination with the induced charge on the surface of the solution at the tip of the capillary, result in formation of droplets 122. The droplet size and rate of formation can be controlled by adjusting one or more of the following: (1) the voltage and/or current output by the voltage supply 110 (thereby adjusting the electric field strength and charge density at the surface of the solution); (2) the rate of rotation or power of the pump 124 (thereby adjusting the pressure within the reservoir 102); (3) the average radius of the capillary 104; (4) the average radius of the annular electrode 108; (5) the surface tension of the solvent 118; and/or (6) the temperature or conductivity of the solution.

As a result of the applied electric field and resulting charge accumulation at the surface of the solution, which causes the droplets 122 to form, the droplets possess excess positive or negative charge. As the solvent evaporates from the charged droplet 122, the charge in the droplet leads to further increased or decreased ion concentrations within the droplet. For example, in the case where the droplet is positively charged and the ion is a hydrogen cation, the hydrogen cation concentration in the droplet increases, resulting in increased droplet acidity. Alternatively, in the case where the droplet is negatively charged and the ion is hydroxide, the hydroxide ion concentration in the droplet increases, resulting in increased droplet basicity. This change in ion concentration leads to the formation of reaction intermediates and causes the monomer/oligomer solute 120 within the droplet to be in a non-equilibrium, and therefore more highly reactive, state. Consequently, when the droplet 122 strikes the surface of the substrate 112 and the solvent 118 evaporates (or while it is evaporating), the monomers/oligomers are in an activated, non-equilibrium state, and form covalent bonds directly to the surface of the substrate 112 or to previously deposited portions (i.e., previously deposited monomer/oligomer units) of the coating 113, in an attempt to drive the system into a state closer to equilibrium. The process by which the monomer/oligomer units form covalent bonds to the surface of the substrate is commonly referred to as surface grafting.

In some implementations, additives such as surfactants, acids, or salts are added to the solvent 118 in order to adjust the surface tension or conductivity of the solvent and thereby adjust the size and the rate of formation of the droplets 122. In other implementations, weak acids, ions, or non-reactive molecules are added to the solution to control or adjust the properties of the resulting film or coating 113. In still other implementations, the solution contains pH stabilizers or modifiers. In yet other implementations, the solution includes additional materials which are also transported to the surface of the substrate 112 in droplets (or are deposited separately) 122 and are subsequently encapsulated by the coating 113, i.e., the coating 113 is formed at least partially around the additional material. Examples of such additional materials include cells, biological signals, vitamins, minerals, pigments, aromas, enzymes, catalysts, and time-release drugs. The additional materials can be non-reactive materials, can be reactive with both the coating 113 and the surface of the substrate 112, can be reactive with the surface of the substrate 112 but not with the coating 113, or can be reactive with the coating 113 but not with the surface of the substrate 112.

In some implementations, oxidation or reduction reactions take place in the droplets in the solution while the droplets are in or near the spray head, forming reactive intermediates or leading to the formation of new compounds which subsequently react with the substrate. For example, as the solvent evaporates from the charged droplet 122 prior to the droplet reaching the surface of the substrate, ion concentrations in the droplet increase or decrease, and the state of the solution in the droplet shifts further towards non-equilibrium relative to solution in the reservoir. This drives the formation of reactive intermediates or new compounds, since forming these reactive intermediates or new compounds represents a new equilibrium state within the droplets. An example of this could include the formation of reactive derivatives of carboxylic acid functionalities such as acyl halides (e.g. acyl chloride) that react with alcohols or amines to form esters of amines. Other examples of reactive intermediates include carbocation formation under high hydrogen cation concentrations within the droplets. In still other implementations, the reactive intermediate is a salt.

For many applications, it is desirable that the pH of the solution be very close to the threshold required to activate the monomers/oligomers in the solute 120 while the solution is contained in the reservoir 102, prior to droplet formation. This is because the change in pH following droplet formation may be small, so if the pH of the solution prior to droplet formation is not sufficiently close to the threshold value, the change in pH following droplet formation may not be adequate to catalyze certain types of polymerization reactions. For example, if a minimum pH is required to activate the monomers/oligomers and catalyze reactions, the pH of the solution can be slightly below this minimum threshold pH value (i.e., between 0.5 and 0.999 times the threshold pH value). If a pH below some maximum value is required to activate the monomers/oligomers and catalyze reactions, the pH of the solution can be slightly greater than this maximum threshold pH value (i.e., between 1.001 and 2 times the threshold pH value). For example, if a pH below 5 is optimal for catalyzing reactions, the pH of the solution prior to droplet formation can be between about 5.1 and 8. In some applications where a minimum pH is required to activate the monomers/oligomers and catalyze a reaction, the pH of the solution prior to droplet formation can be less than 0.9 times or less than 0.8 times this minimum threshold pH value. In some applications where the pH required to activate the monomers/oligomers and catalyze the reaction must be below some maximum threshold pH value, the pH of the solution prior to droplet formation can be greater than 1.1 times or greater than 1.3 times this maximum threshold pH value.

The pH of the solution while it is contained in the reservoir 102 can be adjusted by the addition of acids or bases to the solution, either before or after it is placed in the reservoir. Hence, although the solution may be free of strong acids and bases, in some cases reasonably small quantities of acids and bases may be added to or included in the solution in order to better tune the pH of the solution. The ability to externally modify solution pH with the application of an external field enables molecules with very high acid dissociation constant (pKa) values (for example, above 15.5) to be added to the solution in the reservoir without substantially catalyzing reactions within the reservoir prior to droplet formation, while still allowing for reactions to occur at the surface of the substrate after the droplets are incident on the substrate.

Figure 2:
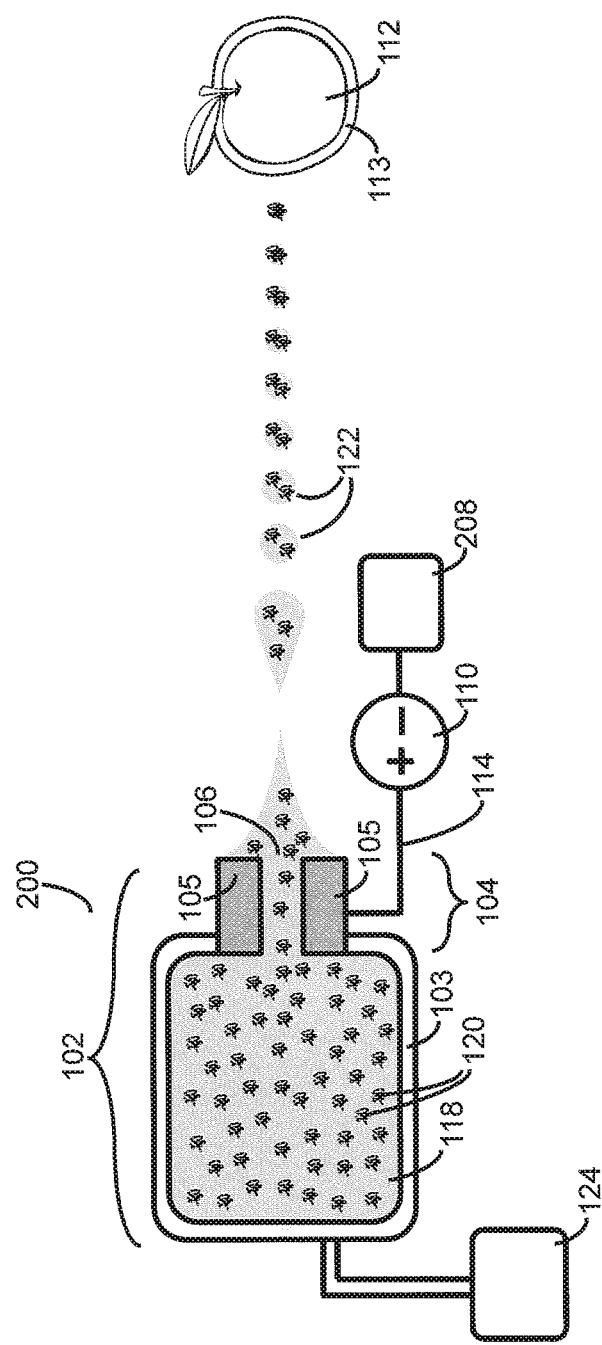

Referring now to FIG. 2, an alternative configuration for a spray head 200 is shown. Spray head 200 of FIG. 2 is similar to spray head 100 of FIG. 1, except that annular electrode 108 shown in FIG. 1 does not need to be included (although it may optionally still be included). Instead, in spray head 200, one terminal of the voltage supply 110 is electrically connected to the walls 105 of the capillary 104, for example with a conductive wire 114, and the opposite terminal of the voltage supply 110 is electrically connected to a charge source 208. The charge source 208 can for example be an electrical ground or a DC voltage plane. The charge source 208 supplies/sinks electric charge to/from the capillary 104 when a voltage is applied by the voltage supply 110. Similar to the case of spray head 100, the applied voltage between the capillary 104 and the charge source 208 results in a net accumulation of electric charge along the surface of the solution adjacent to the tip 106 of the capillary 104. The polarity of the charge (i.e., whether it is positive or negative) is determined by the polarity of the applied voltage. Capillary surface tension effects, in combination with the charge on the surface of the solution at the tip of the capillary 104, result in the droplets 122 being formed. This mode of operation for the spray head is known as conduction mode, while the mode of operation in which the voltage is applied between the capillary 104 and an annular electrode 108 (as in FIG. 1) is known as induction mode.

In some implementations, the monomers/oligomers of the solute 120 are bifunctional or polyfunctional molecules. A bifunctional or polyfunctional molecule is one which includes two (in the case of bifunctional) or multiple (in the case of polyfunctional) bonding sites for forming covalent bonds with other atoms or molecules. As such, bifunctional and polyfunctional molecules are each able to form covalent bonds with multiple other atoms or molecules. When bifunctional/polyfunctional molecules are implemented as the monomers/oligomers of the solute 120, the coating 113 forms as follows. Some or all of the first reactive monomers/oligomers to reach the surface of the substrate 112 form covalent bonds to the substrate at a bonding site at the surface of the substrate (assuming the substrate's surface is composed of a material capable of reacting with the incident reactive intermediate). Because each of the monomers/oligomers include multiple bonding sites, subsequent monomers/oligomers form a covalent bond either to the substrate 112 at a non-occupied bonding site at the surface of the substrate, or to a non-occupied bonding site of one of the already bound monomers/oligomers. In this way, a polymer film coating is "grown" over the surface of the substrate, where a substantial number of the monomer/oligomer units of the coating 113 are covalently bonded to one or more neighboring molecules, and the entire coating 113 is tightly bound to the surface of the substrate 112.

Coatings formed by the polymerization reaction described above can have high structural integrity and very low permeability, making them ideal for reducing water loss and oxidation in produce and other edible products, while also helping prevent surface abrasion. Because strong acids are not used to catalyze elimination reactions during the coating growth process, the coatings can be edible and safe to consume. Thus, in some applications where the coatings are applied to edible products, the coatings can allow for extended transport of the edible products without or with reduced need for refrigeration, and the coatings can be safely consumed along with the edible products.

Various properties of coatings formed by the polymerization reaction described above can be tuned by adjusting various parameters of the deposition precursor, as well as parameters of the components of the spray head 100. For example, the rate of ripening of post-harvest fruit and produce can be adjusted by tuning the cross-link density of the polymer coating, its thickness, and/or its composition. Polymer coatings grown from bifunctional or polyfunctional monomer units tend to have higher cross-link densities than those grown from bifunctional or polyfunctional oligomer units (e.g., dimers, trimers, tetramers, polymers, etc.), thereby resulting in slower rates of ripening, transpiration, and/or senescence. Hence, when slow ripening rates are desired, solutes formed of monomer units can be used, while if faster ripening rates are desired, solutes formed of oligomer units can be used.

When monomer units are used, the cross-link density can be decreased slightly by allowing some of the monomers to react with one another and form oligomer chains prior to reacting at the surface of the substrate 112. For example, in larger droplets 122 (or at higher reservoir concentrations) that contain larger numbers of monomer units, there is a higher probability of monomers bonding with one another to form oligomer units prior to reacting with the surface of the substrate 112. Hence, larger droplets, higher monomer concentrations in the solution within the reservoir, as well as a larger separation between the tip 106 of the capillary 104 and the substrate 112, tend to lead to lower cross-link densities.

Furthermore, because the solvent in the droplets 122 evaporates while the droplets are traveling between the spray head and the substrate, the concentration of the solute incident on the surface of the substrate 112 can be tuned by adjusting both the size of the droplets and the distance that the droplets travel through the air. As previously described, the droplet size and rate of formation can be controlled by adjusting the voltage that is output by the voltage supply 110 (thereby adjusting the electric field strength), the rate of rotation of the pump 124 (thereby adjusting the pressure within the reservoir 102), the average radius of the capillary 104, the average radius of the annular electrode 108, and/or the surface tension, conductivity, or temperature of the solvent 118.

In some implementations, the monomers/oligomers of the solute 120 are monofunctional molecules. A monofunctional molecule is one which only includes a single bonding site for forming a covalent bond with another atom or molecule. As such, once a monofunctional molecule has formed a covalent bond with another atom or molecule, it will not participate in further reactions. When the monomers/oligomers of the solute 120 are monofunctional molecules, after being transported to the surface of the substrate 112 in a charged droplet 122, the reactive monofunctional molecules each form a covalent bond to a bonding site on the surface of the substrate 112, after which they are unable to participate in further reactions. As more reactive monofunctional monomers/oligomers are transported to the surface of the substrate 112, they covalently bond to bonding sites of the substrate surface until all of the bonding sites are occupied. Thus, the resultant coating is comprised of a monolayer of the monomer/oligomer constituents, rather than being a polymer film. Such films are typically more permeable than films formed by the polymerization reactions previously described, making them ideal for applications where faster ripening is desirable. Additionally, these monolayer films typically require smaller quantities of precursor solution and can be formed in a shorter time than the polymer films previously described, resulting in reduced cost as compared to the cost of creating the polymer films. Inclusion of such monofunctional units in the deposition process may also be used to control crosslinking density of deposited bifunctional/polyfunctional monomers/oligomers by reducing the effective number of functional units capable of covalent bonding, as the reaction with monofunctional units reduces the number of available grafting sites for newly deposited monomers/oligomers.

Figure 3:
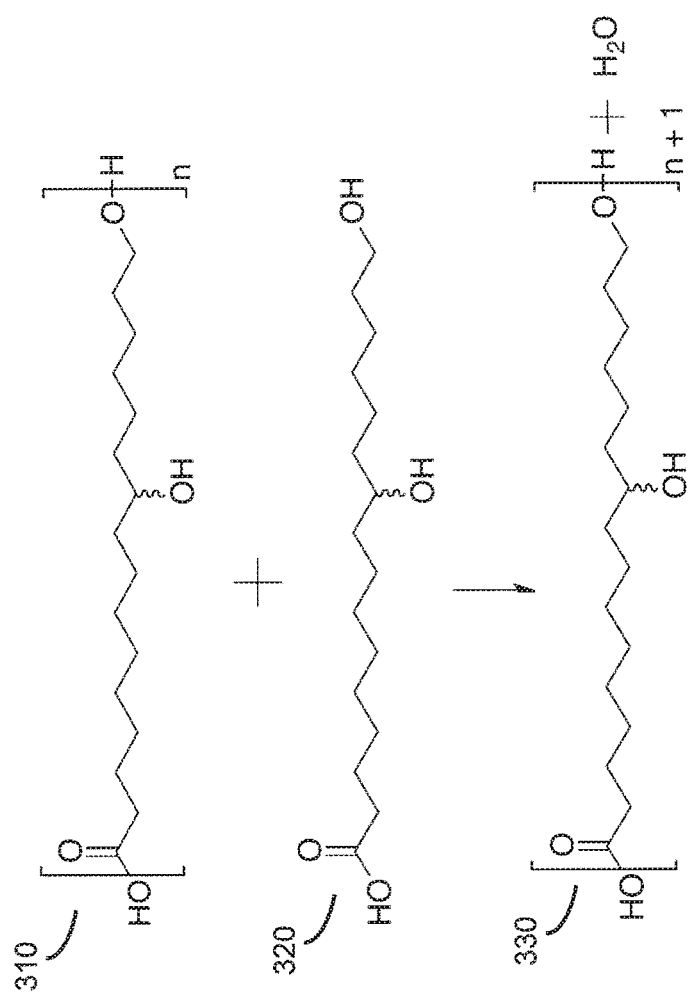
FIG. 3 is a schematic representation of a chemical reaction that leads to the formation of a coating.

FIG. 3 is a schematic representation of an example chemical reaction that leads to the formation of the organic coatings described above. In this example, the substrate or previously deposited material is a linear polyester chain represented by the formula 310 in FIG. 3. This polymer chain is covalently bound by ester linkages and is polyfunctional, containing one carboxylic acid functionality and n+1 hydroxyl functionalities. The addition of a polyfunctional hydroxy fatty acid chain (shown in formula 320) in the presence of an acid catalyst results in the formation of an ester bond between the hydroxyl group of the linear polyester chain and the carboxylic acid group of the polyfunctional hydroxy fatty acid via an elimination reaction in which water is the byproduct (shown in formula 330).

Figure 4:
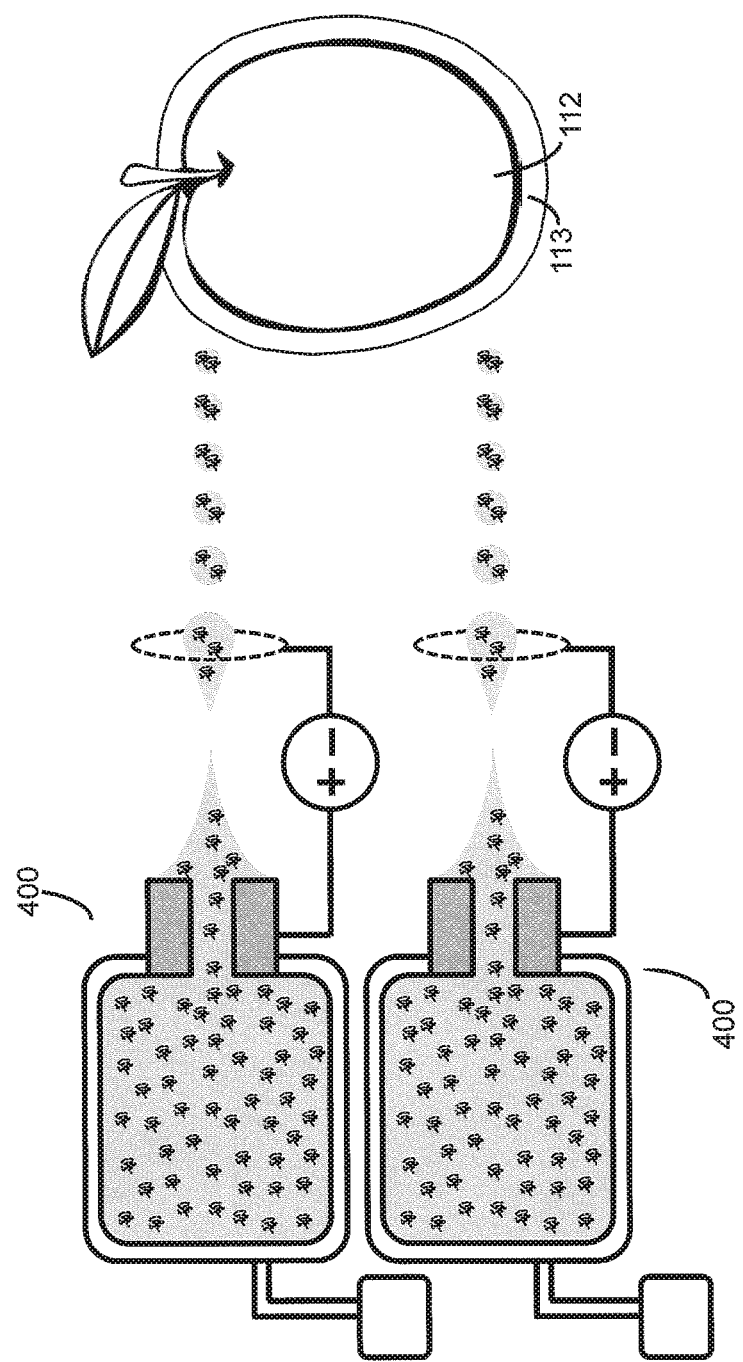
FIG. 4 is a side view of another deposition system for a coating.

Although FIGS. 1 and 2 each illustrate a single spray head 100 or 200 being used to apply a coating 113 to a substrate 112, a plurality of spray heads (i.e., at least 2, as shown in FIG. 4), at least 3, or at least 4 spray heads configured in an array (not shown) can be used to apply the coating 113. In this case, the monomers/oligomers in the activated droplets from each spray head 400 are able to react with and form covalent bonds to the substrate 112 and to other activated monomer/oligomer units from any of the spray heads 400 in the array. While in some cases the solution composition in each of the spray heads is similar or substantially the same, in other cases the solution compositions in different spray heads of the array may be different. In comparison to using a single spray head, such an array can reduce the time required to coat a substrate and can allow for large scale production of the coatings 113, as described herein.

In addition to forming coatings that surround or at least partially surround a substrate, the spray heads of FIGS. 1, 2, and 4, along with the associated methods described herein, can also be used to form other types of material structures. For example, the monomer/oligomer units can be used as "ink" in three dimensional printing systems. That is, a three dimensional material structure can be built from monomer/oligomer units delivered to a substrate using the systems and methods described above. Such printed three dimensional polymer structures can be very inexpensive to fabricate, and can have a degree of structural integrity which can be modified in-situ due to the ability to form and control the density of tight covalent bonds formed between the adjacent monomer/oligomer units. In this application, the monomer/oligomer units may be reactive with one another, but not with the substrate on which they are deposited, such that the resulting printed three dimensional structure may easily be separated from the substrate.

Alternatively, the monomer/oligomer units may be reactive with one another and also with the substrate on which they are deposited, such that the printed three dimensional structure is formed as an extension of the substrate. An example of such an application includes printing tread directly onto a tire (such as a bicycle or automobile tire made of suitable material), where the tire is smooth prior to the printing of the tread but includes a tread pattern after printing. As another example, the printed structures can be used as scaffolds for biological materials such as cells or proteins. In this example, biocompatible monomer units may be deposited layer by layer or "printed" into a desired shape which may then serve as a scaffold for cell growth. This technique has the added advantage that during deposition, peptide sequences, proteins, or other biological signaling molecules may be covalently bound to specific positions of the scaffold, thus allowing directed cell growth on the scaffold.

In still another variation of the systems and methods described herein, the solution in the spray head reservoir does not contain solute molecules which are capable of undergoing polymerization reactions. Instead, the solution may contain only solvent molecules, ions, acids, and/or other highly non-polymerizable molecules. In this variation, the droplets which are formed contain no monomer/oligomer units. The field generated by the voltage supply and the associated charging of the droplets can change the ion concentration or the acidity or basicity of the solution in the droplets, as compared to the solution in the reservoir prior to droplet formation. When the droplets are directed towards a substrate, they can catalyze reactions (e.g. polymerization or depolymerization) between molecules already on the substrate. This alternative variation may also be used to modify the substrate surface prior to coating deposition. That is, acidified or basified solvent droplets without any monomer/oligomer solute can first be applied to the substrate in order to modify the surface of the substrate, followed by application of droplets containing both solvent and monomer/oligomer solute in order to form a coating or other three-dimensional structure. Alternatively, such a process could be used to sanitize agricultural equipment, produce surfaces, or medical equipment, for example, without the use of more toxic chemicals.

The methods described herein allow for the formation of charged droplets of controllable solvent/solute compositions and concentrations with a controllable level of acidity or pH or the formation of alternative reactive intermediates (e.g. acyl halides). In some implementations, these methods provide a physicochemical technique by which to catalyze elimination reactions without the addition of strong acids. Furthermore, the methods described herein can allow for the controllable delivery of droplets containing activated monomers/oligomers that participate in reactions (e.g. elimination reactions) once they are deposited on a substrate.

A number of implementations have been described. Nevertheless, it will be understood that various modifications may be made without departing from the spirit and scope of the techniques and devices described herein. For example, although in FIGS. 1, 2, and 4 the solution is maintained in the reservoir of one or more spray heads prior to droplet formation, the solution may be maintained in an external reservoir and provided to the spray head, for example through a tube, or by dripping out of the reservoir, as additional solution is needed. Additionally, while in FIGS. 1, 2, and 4 the droplets are formed and made to be reactive by a voltage applied between the capillary and either the annular electrode or an electrical ground, other methods of forming activated or highly reactive droplets can be implemented. For example, rather than applying a voltage directly to or between portions of the spray head, an external electric field can be created, and the surface of the solution at which the droplets are formed is placed within the electric field. Or, rather than using an electric field to induce formation of reactive droplets, heat or photoexcitation could be used. That is, the surface of the solution at which the droplets are formed can be heated, or photons can be directed onto the surface, in order to induce formation of activated droplets.

Other processes may also be employed to help steer the droplets onto the surface, for example air currents or additional electric fields. Features shown in each of the implementations may be used independently or in combination with one another. Accordingly, the invention is only limited by the scope of the following claims.

What is claimed is:

1. A method of forming a coating over a surface of a substrate from structural units contained within a liquid solution, the liquid solution comprising a solvent, the method comprising:
    forming positively charged droplets of the liquid solution, wherein the droplets include a plurality of the structural units;
    directing the droplets to the surface of the substrate while allowing at least a portion of the solvent within the droplets to evaporate, thereby increasing a positive charge concentration within the droplets; and
    forming the coating over the surface of the substrate from the plurality of the structural units in the droplets; wherein
    the increase in the positive charge concentration within the droplets as the droplets evaporate causes the structural units to be in a more highly reactive state, thereby allowing the structural units in the droplets to form covalent bonds to one another or to the surface of the substrate.

2. The method of claim 1, wherein the liquid solution further comprises an additive selected from the group consisting of a surfactant, an acid, and a salt.

3. The method of claim 1, wherein the coating is formulated to prevent or suppress water loss or uptake by the substrate, volatile loss or uptake by the substrate, oxidation via reaction with oxygen gas that can diffuse into the substrate, or surface abrasion.

4. The method of claim 1, wherein the positively charged droplets are formed by applying a voltage between an electrode of a spray head containing the liquid solution and a capillary of the spray head.

5. The method of claim 1, wherein the substrate is edible to humans, and the coating is an edible coating.

6. The method of claim 1, wherein the structural units comprise monomer units, oligomer units, or combinations thereof.

7. A method of forming a coating over a surface of a substrate from structural units contained within a liquid solution, the liquid solution comprising a solvent, the method comprising:
    forming negatively charged droplets of the liquid solution, wherein the droplets include a plurality of the structural units;
    directing the droplets to the surface of the substrate while allowing at least a portion of the solvent within the droplets to evaporate, thereby increasing a negative charge concentration within the droplets; and
    forming the coating over the surface of the substrate from the plurality of the structural units in the droplets; wherein
    the increase in the negative charge concentration within the droplets as the droplets evaporate causes the structural units to be in a more highly reactive state, thereby allowing the structural units in the droplets to form covalent bonds to one another or to the surface of the substrate.

8. The method of claim 7, wherein the liquid solution further comprises an additive selected from the group consisting of a surfactant, an acid, and a salt.

9. The method of claim 7, wherein the droplets serve to sanitize the substrate.

10. The method of claim 9, wherein the substrate comprises agricultural equipment, produce, or medical equipment.

11. The method of claim 7, wherein the structural units comprise monomer units, oligomer units, or combinations thereof.

12. A method of forming a coating over a surface of a substrate from structural units contained within a solvent of a liquid solution, the liquid solution further comprising an enzyme, the method comprising:
forming droplets of the liquid solution, wherein the droplets include a plurality of the structural units and the enzyme;

directing the droplets to the surface of the substrate; and forming the coating over the surface of the substrate from the plurality of the structural units in the droplets; wherein the forming of the coating comprises allowing the structural units in the droplets to form covalent bonds to one another or to the surface of the substrate;

the enzyme is reactive with the coating or with the surface of the substrate; and the substrate is edible and the coating is an edible coating.

13. The method of claim 12, wherein the structural units comprise monomer units, oligomer units, or combinations thereof.

14. The method of claim 13, wherein the coating comprises a polymer formed from the structural units.

15. The method of claim 13, wherein the monomer units, oligomer units, or combinations thereof comprise fatty acids.

16. The method of claim 12, wherein the enzyme is reactive with the coating but not with the surface of the substrate.

17. The method of claim 12, wherein the coating prevents or suppresses water loss from the substrate.

18. The method of claim 12, wherein the edible substrate is selected from the group consisting of fruits, vegetables, produce, seeds, nuts, beef, poultry, and seafood.

19. A method of forming a coating over a surface of a substrate from a plurality of structural units, the structural units comprising monomer units, oligomer units, or combinations thereof, the method comprising:

transporting the structural units onto the surface of the substrate;

transporting an enzyme onto the surface of the substrate; and forming the coating over the surface of the substrate from the plurality of the structural units; wherein the forming of the coating comprises allowing the structural units to form covalent bonds to one another or to the surface of the substrate; and the substrate is edible and the coating is an edible coating.

20. The method of claim 19, wherein the enzyme is reactive with the coating or with the surface of the substrate.

21. The method of claim 19, wherein the enzyme is reactive with the coating but not with the surface of the substrate.

22. The method of claim 19, wherein the enzyme is reactive with the surface of the substrate but not with the coating.

23. The method of claim 19, wherein the forming of the coating comprises polymerization of the structural units, wherein the polymerization occurs directly on or adjacent to the surface of the substrate.

24. The method of claim 19, wherein the monomer units, oligomer units, or combinations thereof comprise fatty acids possessing a carboxyl functionality and a hydroxyl functionality.

25. The method of claim 19, wherein the monomer units, oligomer units, or combinations thereof comprise a saturated or unsaturated carbon chain.

26. The method of claim 25, wherein the monomer units, oligomer units, or combinations thereof further comprise a glycerol constituent.

27. The method of claim 19, wherein the coating prevents or suppresses water loss from the substrate.

28. The method of claim 19, wherein the edible substrate is selected from the group consisting of fruits, vegetables, produce, seeds, nuts, beef, poultry, and seafood.

* * * * *